US008254384B2

(12) United States Patent
Liu (10) Patent No.: US 8,254,384 B2
(45) Date of Patent: Aug. 28, 2012

(54) PACKET TRANSMISSION SYSTEM, PACKET TRANSMISSION METHOD, PACKET UPDATE METHOD, HOST APPARATUS, AND COMPUTER PROGRAM PRODUCT THEREOF FOR THE PACKET TRANSMISSION SYSTEM

(75) Inventor: Yung-Chih Liu, Taipei (TW)

(73) Assignee: Institute for Information Industry, Taipei (TW)

( * ) Notice: Subject to any disclaimer, the term of this patent is extended or adjusted under 35 U.S.C. 154(b) by 773 days.

(21) Appl. No.: 12/326,716

(22) Filed: Dec. 2, 2008

(65) Prior Publication Data

US 2010/0074169 A1  Mar. 25, 2010

(30) Foreign Application Priority Data

Sep. 25, 2008  (TW) .............................. 97136809 A (51) Int. Cl.
*H04L 12/56* (2006.01)
(52) U.S. Cl. ....................................... 370/389; 370/400
(58) Field of Classification Search .......... 370/335–336, 370/338–339, 342–343, 345, 352–356, 389, 370/392, 400–401, 328–329, 465; 455/404.2, 455/414.2, 456.1–456.3
See application file for complete search history.

(56) References Cited

U.S. PATENT DOCUMENTS

| 6,463,290 | B1 | 10/2002 | Stilp et al. | |
|---|---|---|---|---|
| 6,690,659 | B1 * | 2/2004 | Ahmed et al. | ................ 370/328 |
| 6,747,972 | B1 * | 6/2004 | Lenoski et al. | ................ 370/394 |
| 6,939,008 | B2 * | 9/2005 | Shibatani et al. | ................ 353/31 |
| 6,973,506 | B2 * | 12/2005 | Ishiyama et al. | .............. 709/245 |
| 7,028,092 | B2 * | 4/2006 | MeLampy et al. | ............. 709/230 |
| 7,512,630 | B2 * | 3/2009 | Kling et al. | ........................ 1/1 |
| 7,773,598 | B2 * | 8/2010 | Lindholm et al. | ............. 370/392 |
| 2002/0080784 | A1 * | 6/2002 | Krumel | ......................... 370/389 |
| 2004/0184440 | A1 * | 9/2004 | Higuchi et al. | ................ 370/349 |
| 2005/0025151 | A1 * | 2/2005 | Marce et al. | ................... 370/392 |

FOREIGN PATENT DOCUMENTS

KR  10-2003-0043987 A  6/2003

OTHER PUBLICATIONS

"Transmission Control Protocol (TCP) Fundamentals and General Operation," *TCP/IP Guide*, Chapter 46, no search press, Oct. 2005.

* cited by examiner

*Primary Examiner* — Chi H. Pham
*Assistant Examiner* — Kevin Mew
(74) *Attorney, Agent, or Firm* — Patterson Thuente Christensen Pedersen, P.A.

(57) ABSTRACT

A packet transmission system, a packet transmission method, a packet update method, a host apparatus, and a computer program product thereof for the packet transmission system are provided. The packet transmission method comprises the following steps: transmitting a first positioning packet that has a first message serial number; receiving the first positioning packet; generating a temporary packet that has a second message serial number; determining that the first message serial number is smaller than the second message serial number; transmitting the temporary packet; receiving the temporary packet and updating the first message serial as the second message serial number; and transmitting a second positioning packet that has the second message serial number. Thereby, the system not only prevents repeat transmission, but also enhances positioning reliability by using two-way transmission.

40 Claims, 8 Drawing Sheets

PACKET TRANSMISSION SYSTEM, PACKET TRANSMISSION METHOD, PACKET UPDATE METHOD, HOST APPARATUS, AND COMPUTER PROGRAM PRODUCT THEREOF FOR THE PACKET TRANSMISSION SYSTEM

This application claims the benefit of priority based on Taiwan Patent Application No. 097136809 filed on Sep. 25, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a packet transmission system, a packet transmission method, a packet update method, a host apparatus and a computer program product thereof for the packet transmission system. In particular, the present invention relates to a packet transmission system that increases the positioning speed and accuracy by using two-way transmission of packets, and a packet transmission method, a packet update method, a host apparatus and a computer program product thereof for the packet transmission system.

2. Descriptions of the Related Art

Over recent years, with the widespread use of mobile communications, mobile communication apparatuses are becoming more diversified and prevalent. However, current mobile communication apparatuses commercially available, for example, those compatible with Global System for Mobile Communications (GSM), Wideband Code Division Multiple Access (WCDMA), General Packet Radio Service (GPRS), Personal Handy Phone System (PHS), Wireless Fidelity (WiFi) System or Worldwide Interoperability for Microwave Access (WiMAX), all utilize base stations to provide voice, image and data communications and mobile apparatus positioning service.

However, the aforesaid mobile communication systems can provide the positioning service with satisfactory accuracy only when the mobile apparatus is not moving at a high speed or not moving continuously. For instance, only when the user uses the positioning function of a Personal Digital Assistant (PDA) at a fixed location or in a vehicle moving at a low speed, can the aforesaid mobile communication systems provide positioning functions adequate to allow the user to know his own position exactly while still allowing for various communications such as voice, image and data communications. Moreover, the positioning functions of the aforesaid mobile communication systems are mostly limited to coverage areas due to the electromagnetic waves transmitted by the base stations thereof.

However, if a mobile apparatus provides positioning functions with high accuracy only when it is located at a fixed location or moving at a low speed, it will fail to meet requirements of the modern society in most cases. For instance, for a business person in a bus running on an expressway or a train running at a high speed, the positioning function of his mobile apparatus will experience a degradation in positioning accuracy or even failure of the positioning function due to loss of positioning packets transmitted between the mobile apparatus and host apparatus (e.g., a server or switch).

Furthermore, in addition to the problem with positioning accuracy, the aforesaid mobile communication systems all have to establish data transmission channels with the base stations or the host apparatuses continuously to position the mobile apparatus by performing the positioning function at any time. Because of this, the mobile apparatus has to transmit and receive various positioning information on a continuous basis, leading to considerable power consumption.

In view of this, it is important to improve the accuracy of positioning a mobile apparatus while transmitting information and reduce power consumption.

SUMMARY OF THE INVENTION

One objective of this invention is to provide a packet transmission system, a packet transmission method, and a computer program product thereof for the packet transmission system, in which the temporary packet is sent according to the serial number of a positioning packet and that of the temporary packet. This method may not only prevent repeated transmission of the packets, but also confirm whether the packets have been received through two-way transmission of the packets, thus further enhancing the reliability and accuracy of positioning the mobile apparatus.

To this end, the packet transmission system of this invention comprises a mobile apparatus and a host apparatus. The mobile apparatus is configured to generate and transmit a first positioning packet including a first message serial number. The host apparatus is configured to receive the first positioning packet and generate a temporary packet including a second message serial number. When the host apparatus determines that the first message serial number of the first positioning packet is smaller than the second message serial number of the temporary packet, the host apparatus transmits the temporary packet to the mobile apparatus. Upon receiving the temporary packet, the mobile apparatus updates the first message serial number into the second message serial number, and then generates and transmits a second positioning packet including the second message serial number to the host apparatus.

Similarly, to this end, the packet transmission method of this invention comprises the following steps of: transmitting a first positioning packet including a first message serial number; receiving the first positioning packet; generating a temporary packet including a second message serial number; determining that the first message serial number of the first positioning packet is smaller than the second message serial number of the temporary packet; transmitting the temporary packet; receiving the temporary packet, and updating the first message serial number into the second message serial number; and transmitting a second positioning packet including the second message serial number.

This invention further provides a computer program product comprising a plurality of instructions stored in a computer readable medium for the packet transmission system of this invention to perform the packet transmission method described above.

Another objective of this invention is to provide a host apparatus, a packet update method and a computer program product thereof for the packet transmission system. The host apparatus decides whether to delete the temporary packet stored in the host apparatus according to the serial number of the positioning packet and the temporary packet. This method may prevent repeated transmission of the packets, thereby increasing the efficiency of packet transmissions.

To this end, the host apparatus for the packet transmission system of this invention comprises a receiving module, a microprocessor, a comparison module, and a transmitting module. The receiving module is configured to receive a first positioning packet including a first message serial number. The microprocessor is configured to generate a temporary packet including a second message serial number. The comparison module is configured to determine whether the first message serial number of the first positioning packet is smaller than the second message serial number of the temporary packet. If the comparison module determines that the first message serial number is smaller than the second message serial number, then the transmitting module transmits the temporary packet.

Similarly, the packet update method of this invention comprises the following steps of: receiving a first positioning packet including a first message serial number; generating a temporary packet with a second message serial number; determining that the first message serial number of the first positioning packet is smaller than the second message serial number of the temporary packet; and transmitting the temporary packet.

Furthermore, this invention further provides a computer program product comprising a plurality of instructions stored in a computer readable medium for the host apparatus of this invention to perform the packet update method described above.

In summary, instead of transmitting positioning packets on a continuous basis as in the prior art, the packet transmission system, packet transmission method, packet update method, host apparatus and computer program product thereof for the packet transmission system disclosed in this invention can position a mobile apparatus by only transmitting a minimum amount of packets through the positioning packets using limited power sources of the mobile apparatus.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, embodiments will be described to explain this invention, which provides a packet transmission system, a packet transmission method, a packet update method, a host apparatus, and a computer program product thereof for the packet transmission system. However, these embodiments are not intended to limit this invention to any specific environment, applications, or particular implementations described in these embodiments. Therefore, the description of these embodiments is only intended to illustrate rather than to limit this invention. It should be appreciated that in the following embodiments and the attached drawings, elements not related directly to this invention are omitted from depiction.

Figure 1:
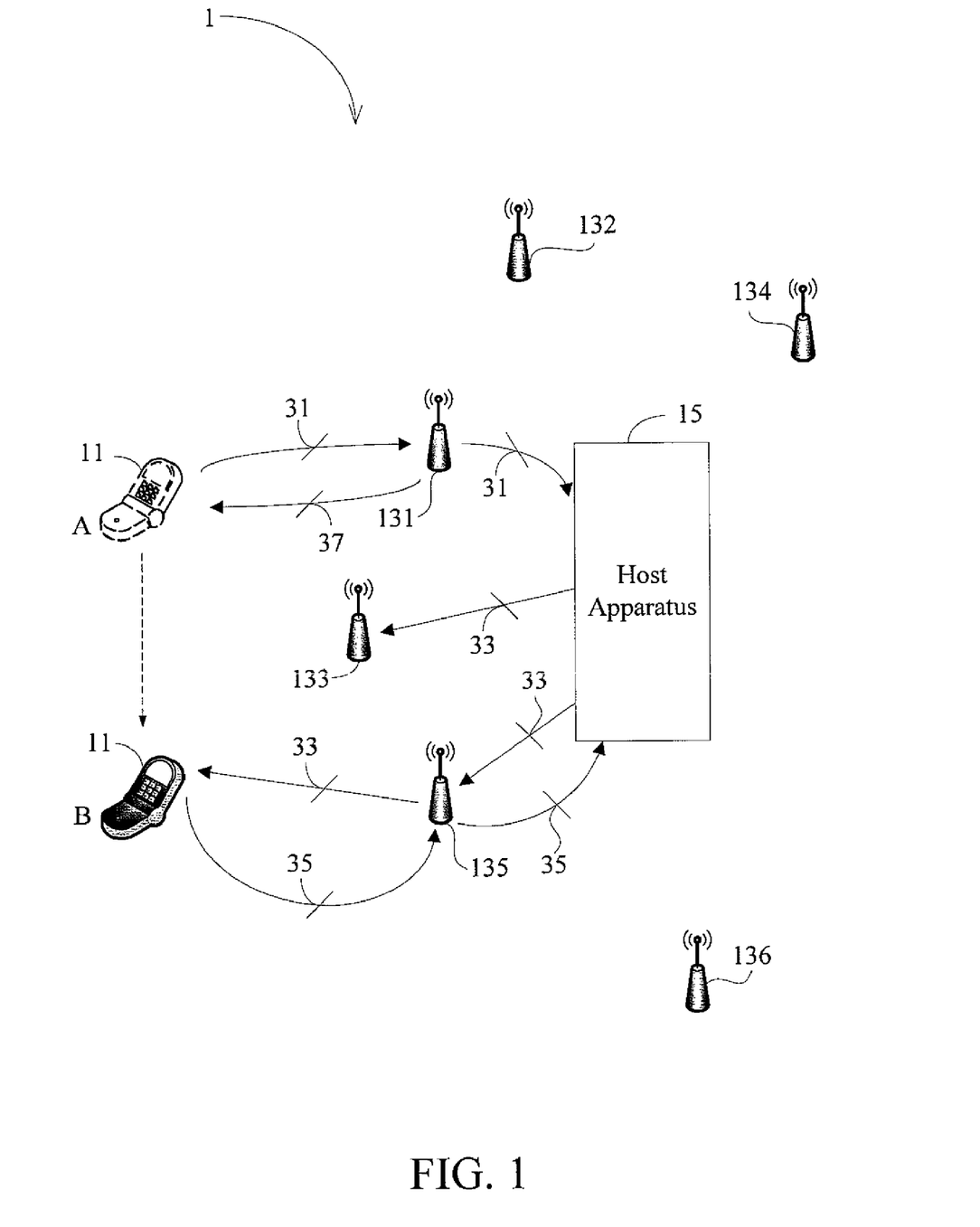
FIG. 1 is a schematic view illustrating a first embodiment of this invention.
Figure 2:
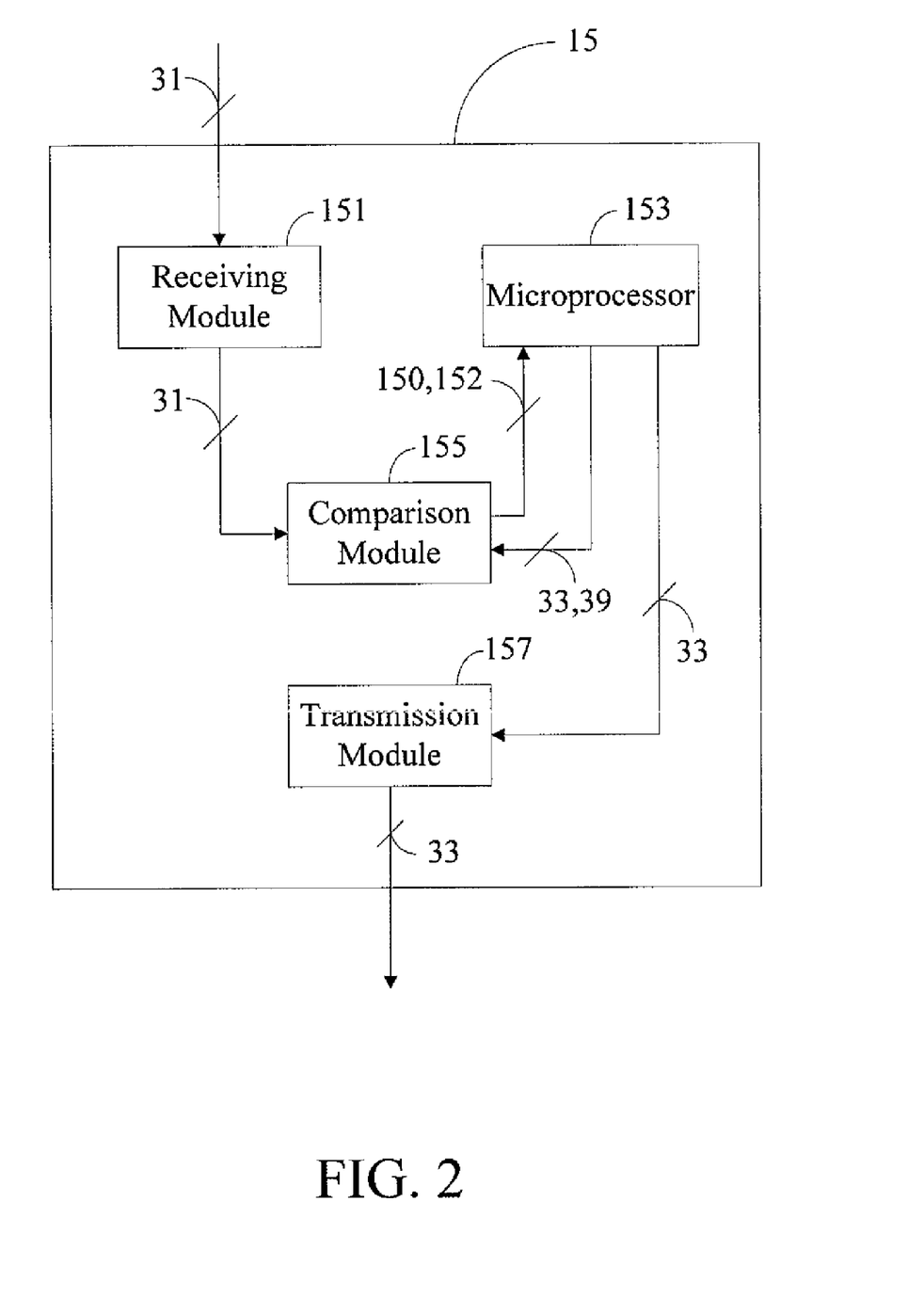
FIG. 2 is a schematic view illustrating the host apparatus of the first embodiment.

As shown in FIG. 1, a first embodiment of this invention is a packet transmission system 1. The packet transmission system 1 comprises a mobile apparatus 11, a plurality of base stations 131, 132, . . . , 136 and a host apparatus 15. The mobile apparatus 11 may be an apparatus that moves with a user such as a cell phone, a navigation apparatus, a PDA or a notebook computer. However, the mobile apparatus 11 described in this invention is not limited to what is set forth herein, and any apparatus that is portable and movable at random may act as the mobile apparatus 11. The base stations 131, 132, . . . , 136 may be any commercially available apparatus capable of forwarding packets. The host apparatus 15, which is as shown in FIG. 2, may be an apparatus capable of processing massive data streams such as a server or a communication switch. The host apparatus 15 comprises a receiving module 151, a microprocessor 153, a comparison module 155, and a transmitting module 157. By using these elements, the host apparatus 15 can use the packet update method for the packet transmission system 1. The operations and functions of the individual elements of the packet transmission system 1 will be detailed hereinbelow.

The mobile apparatus 11 generates and transmits a positioning packet to the host apparatus 15 at regular intervals. The host apparatus 15 then performs positioning of the mobile apparatus 11 by receiving the positioning packets transmitted by the mobile apparatus 11 at different times. For instance, when generated by the mobile apparatus 11, a first positioning packet 31 is transmitted to one of the base stations 131, 132, . . . , 136. More specifically, if the mobile apparatus 11 is located within the coverage of the base station 131, the first positioning packet 31 will be transmitted to the base station 131. Upon receiving the first positioning packet 31, the base station 131 transmits a response packet 37 to the mobile apparatus 11 and forwards the first positioning packet 31 to the host apparatus 15 at the same time.

Figure 3:
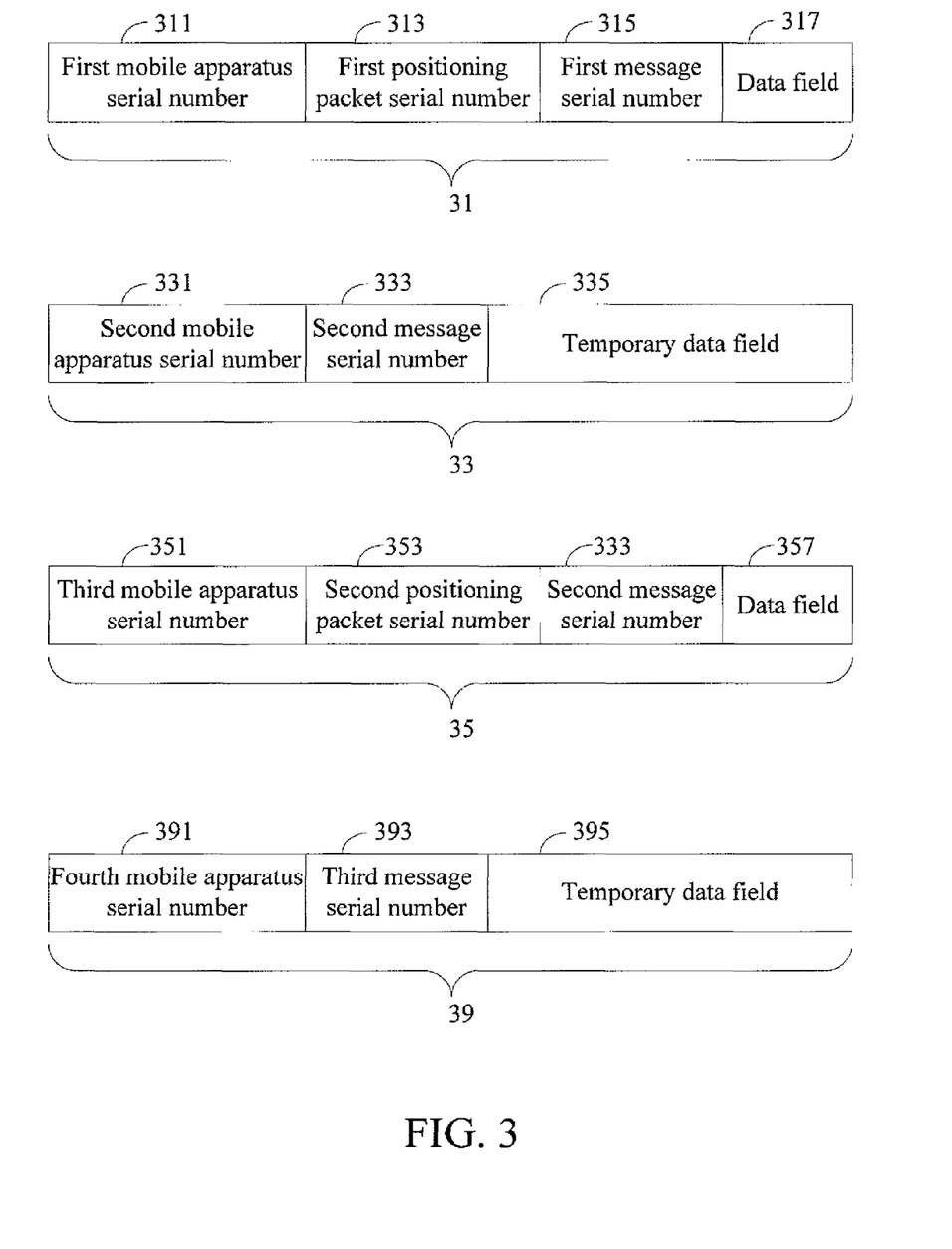
FIG. 3 is a schematic view illustrating packets in the first embodiment.

The first positioning packet 31 is depicted in FIG. 3. The first positioning packet 31 comprises a first mobile apparatus serial number 311, a first positioning packet serial number 313, a first message serial number 315 and a data field 317. The first mobile apparatus serial number 311 is configured to identify that the first positioning packet 31 is transmitted by the mobile apparatus 11. More specifically, the first mobile apparatus serial number 311 has been assigned by the host apparatus 15 to the mobile apparatus 11 early when the packet transmission system 1 was initially established. The first positioning packet serial number 313 is only used to indicate a number of positioning packets transmitted by the mobile apparatus 11. The first message serial number 315 is configured to indicate the number of temporary packets received by the mobile apparatus 11 from the host apparatus 15, a detailed description of which will be made later. The data field 317 is configured to carry other data to be transmitted by the mobile apparatus 11 to the host apparatus 15. By transmitting the positioning packets at regular intervals, the power consumption of the mobile apparatus 11 is reduced and consequently, the battery endurance of the mobile apparatus 11 is prolonged.

Upon receiving the response packet 37 transmitted by the base station 131, the mobile apparatus 11 deletes the data originally carried by the data field 317 of the first positioning packet 31 to prevent data that has been transmitted through the first positioning packet 31 from being re-transmitted during the transmission of the next positioning packet. However, after the host apparatus 15 has received the first positioning packet 31, the response packet 37 may also be transmitted by the host apparatus 15 back to the mobile apparatus 11 directly so that the mobile apparatus 11 deletes the data originally carried by the data field 317 of the first positioning packet 31.

In case the host apparatus 15 is to transmit data to the mobile apparatus 11, the microprocessor 153 of the host apparatus 15 will generate a first temporary packet 33. As shown in FIG. 3, the first temporary packet 33 comprises a second mobile apparatus serial number 331, a second message serial number 333 and a temporary data field 335. The second mobile apparatus serial number 331 is substantially the same as the first mobile apparatus serial number 311 described above, which means that the first temporary packet 33 is to be transmitted to the mobile apparatus 11. The second message serial number 333 is configured to indicate a number of temporary packets transmitted by the host apparatus 15 to the mobile apparatus 11.

After the receiving module 151 of the host apparatus 15 has received the first positioning packet 31, the comparison module 155 retrieves the first positioning packet 31 from the receiving module 151 and the first temporary packet 33 from the microprocessor 153 to determine whether the first message serial number 313 of the first positioning packet 31 is smaller than the second message serial number 333 of the first temporary packet 33. If smaller, it means that the first temporary packet 33 has not been received by the mobile apparatus 11 yet at that time when the mobile apparatus 11 transmitted the first positioning packet 31. Accordingly, the host apparatus 15 must transmit the first temporary packet 33 to the mobile apparatus 11. In this case, the comparison module 155 transmits a transmission signal 150 to the microprocessor 153.

If the comparison module 155 determines that the first message serial number 313 of the first positioning packet 31 is not smaller than the second message serial number 333 of the first temporary packet 33, it means that the mobile apparatus 11 has already received the first temporary packet 33 before it transmitted the first positioning packet 31. Then, the host apparatus 15 must delete the first temporary packet 33. In this case, the comparison module 155 transmits a deletion signal 152 to the microprocessor 153 to delete the first temporary packet 33.

When the host apparatus 15 is ready to transmit the first temporary packet 33, the microprocessor 153 of the host apparatus 15 estimates the direction in and the rate at which the mobile apparatus 11 will possibly move next by making a series of computations according to the positioning packet received by the mobile apparatus 11. Based on this information, the host apparatus 15 selects at least one base station whose coverage is adequate to cover the mobile apparatus 11 to transmit the first temporary packet 33. The estimation to the direction in and the rate at which the mobile apparatus 11 will possibly move next is well known to those of ordinary skill in the art and thus will not be further described herein.

In this embodiment, the microprocessor 153 of the host apparatus 15 calculates that the mobile apparatus 11 will move from a position A where it transmitted the first positioning packets 31 (i.e., the position of the mobile apparatus 11 depicted by a dashed line in FIG. 1) to a position B (i.e., the position of the mobile apparatus 11 depicted by a solid line in FIG. 1). Thus, the microprocessor 153 of the host apparatus 15 first selects the base station 133 and the base station 135 near the chosen position B as destinations to which the first temporary packet 33 is to be transmitted. Then, the transmitting module 157 transmits the first temporary packet 33 to the base stations 133 and the base station 135. Subsequently, one of the base station 133 and the base station 135 forwards the first temporary packet 33 received by it to the mobile apparatus 11 located at the position B. More specifically, when the mobile apparatus 11 has moved to the position B in the coverage area of the base station 135, the first temporary packet 33 will be forwarded by the base station 135 to the mobile apparatus 11.

In this embodiment, upon receiving the first temporary packet 33, the mobile apparatus 11 located at the position B updates the first message serial number 315 of the first positioning packet 31 originally stored in the mobile apparatus 11 into the second message serial number 333 of the first temporary packet 33.

When the mobile apparatus 11 generates and is ready to transmit a second positioning packet 35 to the host apparatus 15, the second positioning packet 35 is as shown in FIG. 3. The second positioning packet 35 comprises a third mobile apparatus serial number 351, a second positioning serial number 353, a second message serial number 333 and a data field 357. The third mobile apparatus serial number 351 of the second positioning packet 35 is substantially the same as the first mobile apparatus serial number 311 and the second mobile apparatus serial number 331. Similarly, the second positioning packet serial number 353 is configured to indicate the number of positioning packets transmitted by the mobile apparatus 11. Because the second positioning packet 35 is transmitted following the first positioning packet 31, the second positioning packet serial number 353 is larger than the first positioning packet serial number 313. The data field 357 is also only used to carry other data to be transmitted by the mobile apparatus 11 to the host apparatus 15. The detailed process of transmitting the second positioning packet 35 to the host apparatus 15 is just the same as the aforesaid process of transmitting the first positioning packet 31 to the host apparatus 15, and thus will not be further described herein.

If the host apparatus 15 transmits the next data to the mobile apparatus 11 after it has transmitted the first temporary packet 33, the microprocessor 153 of the host apparatus 15 will generate a second temporary packet 39. As depicted in FIG. 3, the second temporary packet 39 comprises a fourth mobile apparatus serial number 391, a third message serial number 393 and a temporary data field 395. The fourth mobile apparatus serial number 391 is substantially the same as the first mobile apparatus serial number 31, the second mobile apparatus serial number 331 and the third mobile apparatus serial number 351 described above, which means that the second temporary packet 39 will be transmitted to the mobile apparatus 11. The third message serial number 393 is configured to indicate a number of the temporary packets transmitted by the host apparatus 15 to the mobile apparatus 11. Because the second temporary packet 39 is transmitted following the first temporary packet 33, the third message serial number 393 is larger than the second message serial number 333. The detailed process of transmitting the second temporary packet 39 to the mobile apparatus 11 is just the same as the aforesaid process of transmitting the first temporary packet 33 to the mobile apparatus 11, and thus will not be further described herein.

Figure 4:
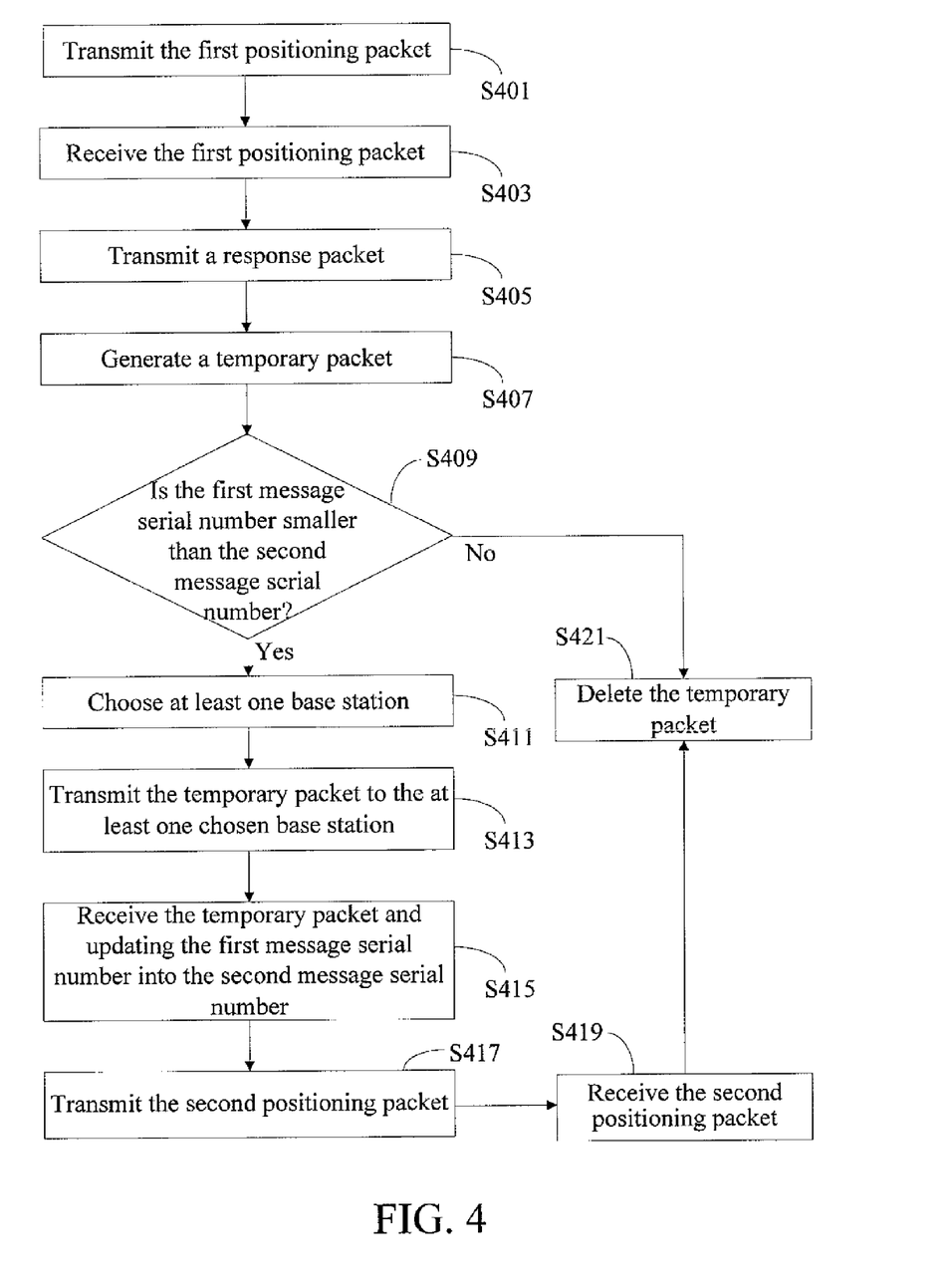
FIG. 4 is a flowchart of a second embodiment of this invention.

FIG. 4 depicts a second embodiment of this invention, which is a packet transmission method adapted for a packet transmission system, such as the packet transmission system 1 described in the first embodiment. In particular, the packet transmission method of the second embodiment may be implemented by a computer program product. When the computer program product is loaded in the packet transmission system via a computer and a plurality of instructions embodied therein is executed, the packet transmission method of the second embodiment will be accomplished. This computer program product may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

The packet transmission method of the second embodiment comprises the following steps. Initially in step S401, a first positioning packet includes a first message serial number that is transmitted. Then, in step S403, the first positioning packet is received. Next, in step S405, a response packet is transmitted. It should be noted that the response packet may be transmitted by one of a plurality of base stations. Subsequently, in step S407, a first temporary packet includes a second message serial number that is generated. Step S409 follows step S407, where the first message serial number of the first positioning packet is compared to the second message serial number of the first temporary packet. If the first message serial number is not smaller the second message serial number, step S421 is executed to delete the first temporary packet.

Otherwise, if the first message serial number is smaller than the second message serial number, step S411 is executed, where at least one base station is chosen from the plurality of base stations. Then, in step S413, the first temporary packet is transmitted to the at least one chosen base station to be transmitted therefrom. Subsequent to step S413, step S415 is executed to receive the first temporary packet and update the first message serial number into the second message serial number. Next, in step S417, a second positioning packet includes a second message serial number that is transmitted, and in step S419, the second positioning packet is received. Finally, in step S421, the first temporary packet is deleted.

In addition to the aforesaid steps, the second embodiment can also execute all the operations and functions described with reference to the packet transmission system 1 of the first embodiment. The method in which the second embodiment executes these operations and functions will be readily appreciated by those of ordinary skill in the art based on the explanation of the first embodiment, and thus will not be further described herein.

Figure 5:
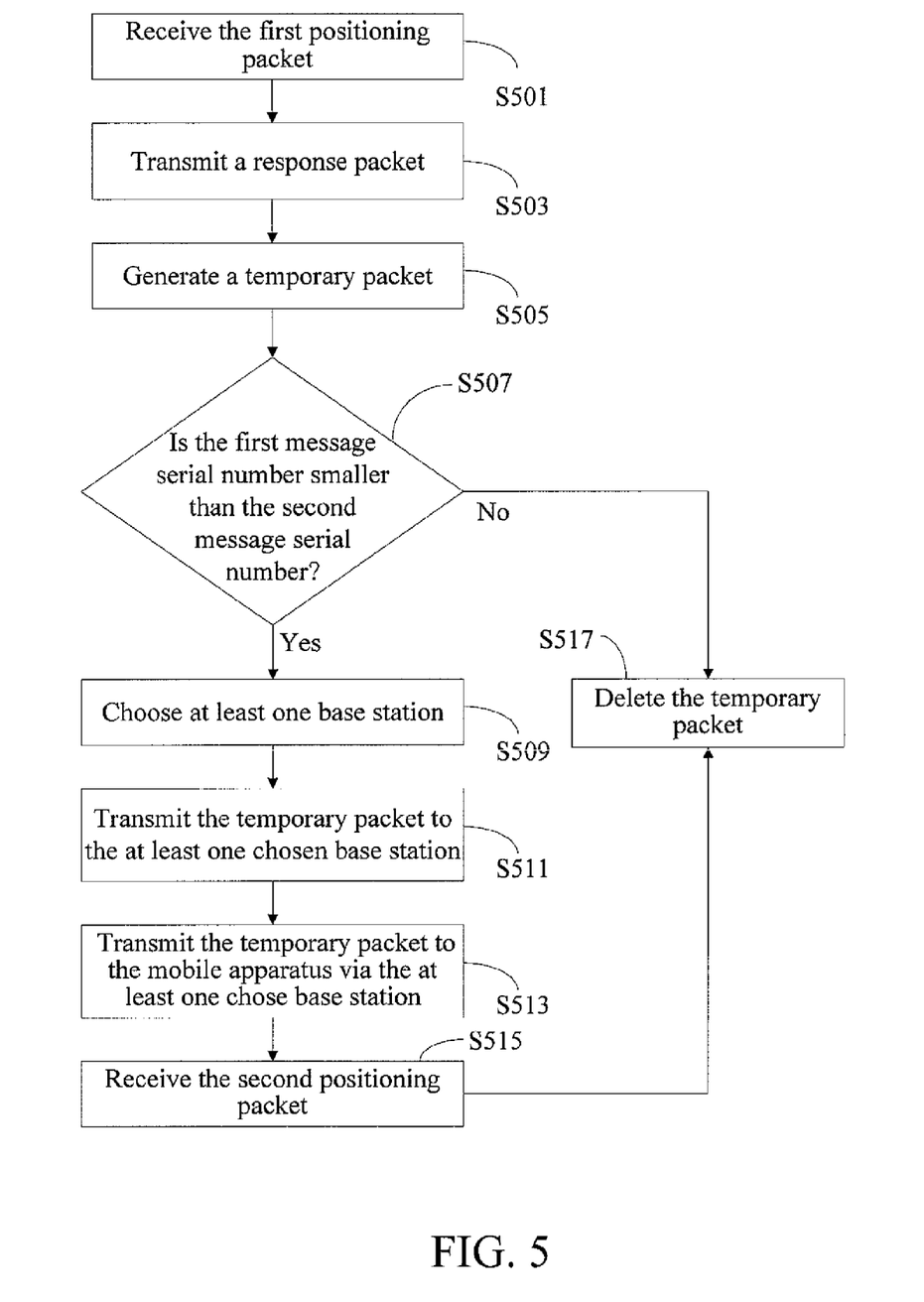
FIG. 5 is a flowchart of a third embodiment of this invention.

FIG. 5 depicts a third embodiment of this invention, which is a packet update method adapted for a host apparatus of a packet transmission system, such as the host apparatus 15 described in the first embodiment. The packet update method of the third embodiment may be implemented by a computer program product. When the computer program product is loaded in the host apparatus via a computer and a plurality of instructions embodied therein is executed, the packet update method of the third embodiment will be accomplished. This computer program product may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

The packet update method of the third embodiment comprises the following steps. Initially, in step S501, a first positioning packet includes a first message serial number that is received. In step S503, a response packet is transmitted. It should be noted that the response packet may be transmitted by one of a plurality of base stations. Subsequently in step S505, a first temporary packet includes a second message serial number that is generated. Step S507 follows step S505, in which the first message serial number of the first positioning packet is compared to the second message serial number of the first temporary packet. If the first message serial number is not smaller than the second message serial number, step S515 is executed to delete the first temporary packet.

Otherwise, if the first messages serial number is smaller than the second message serial number, step S509 is executed, where at least one base station is chosen from the plurality of base stations. Then, in step S511, the first temporary packet is transmitted to the at least one chosen base station. Next, in step S513, where the at least one chosen base station transmits the first temporary packet to the mobile apparatus. In step S515, the second positioning packet includes a second message serial number that is received. Finally, in step S517, the first temporary packet is deleted.

In addition to the aforesaid steps, the third embodiment can also execute all the operations and functions of the host apparatus 15 of the first embodiment. The method in which the third embodiment executes these operations and functions will be readily appreciated by those of ordinary skill in the art based on the explanation of the first embodiment, and thus will not be further described herein.

Figure 6:
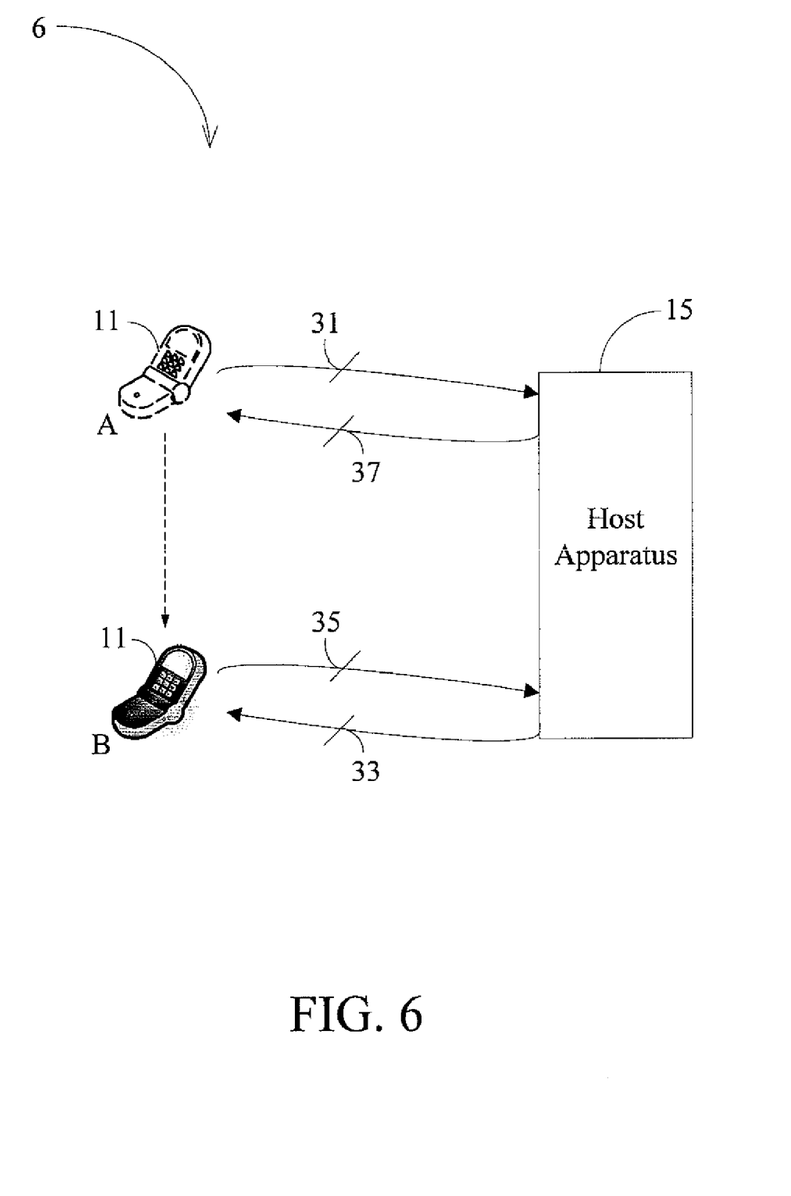
FIG. 6 is a flowchart of a fourth embodiment of this invention.

FIG. 6 depicts a fourth embodiment of this invention, which is another packet transmission system 6 without a base station. Therefore, the host apparatus 15 communicates positioning packets, temporary packets or response packets with the mobile apparatus 11 directly. The operations of individual elements in the packet transmission system 6 are identical to those of the packet transmission system 1 in the first embodiment. The operations and functions of the packet transmission system 6 will be readily appreciated by those of ordinary skill in the art based on the above description, and thus will not be further described herein.

Figure 7:
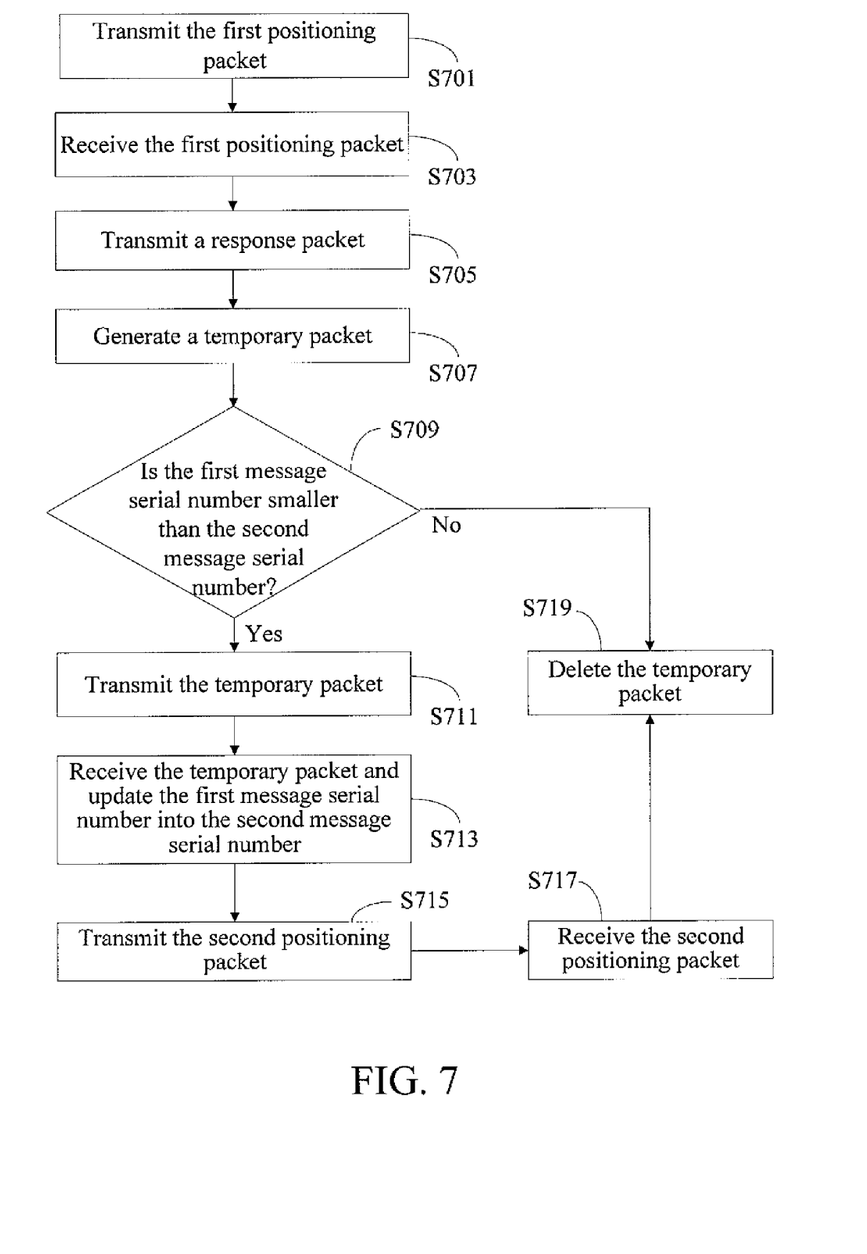
FIG. 7 is a flowchart of a fifth embodiment of this invention.

FIG. 7 depicts a fifth embodiment of this invention, which is a packet transmission method adapted for a packet transmission system, such as the packet transmission system 6 described in the fourth embodiment. In particular, the packet transmission method of the fifth embodiment may be implemented by a computer program product. When the computer program product is loaded in the packet transmission system via a computer and a plurality of instructions embodied therein is executed, the packet transmission method of the fifth embodiment will be accomplished. This computer program product may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

The packet transmission method of the fifth embodiment comprises the following steps. Initially, in step S701, a first positioning packet includes a first message serial number that is transmitted. Then, in step S703, the first positioning packet is received. Subsequently, in step S705, a response packet is transmitted. In step S707, a first temporary packet includes a second message serial number that is generated. Subsequent to step S707 is step S709, where the first message serial number of the first positioning packet is compared to the second message serial number of the first temporary packet. If the first message serial number is not smaller than the second message serial number, step S719 is executed to delete the first temporary packet.

Otherwise, if the first message serial number is smaller than the second message serial number, step S711 is executed, where the first temporary packet is transmitted. Subsequent to step S711 is step S713 where the first temporary packet is received and the first message serial number is updated into the second message serial number. Then, in step S715, a second positioning packet includes a second message serial number that is received, and in step S717, the second positioning packet is received. Finally, in step S719, the first temporary packet is deleted.

In addition to the aforesaid steps, the fifth embodiment can also execute all the operations and functions of the packet transmission system 6 of the fourth embodiment. The method in which the fifth embodiment executes these operations and functions will be readily appreciated by those of ordinary skill in the art based on the explanation of the fourth embodiment, and thus will not be further described herein.

Figure 8:
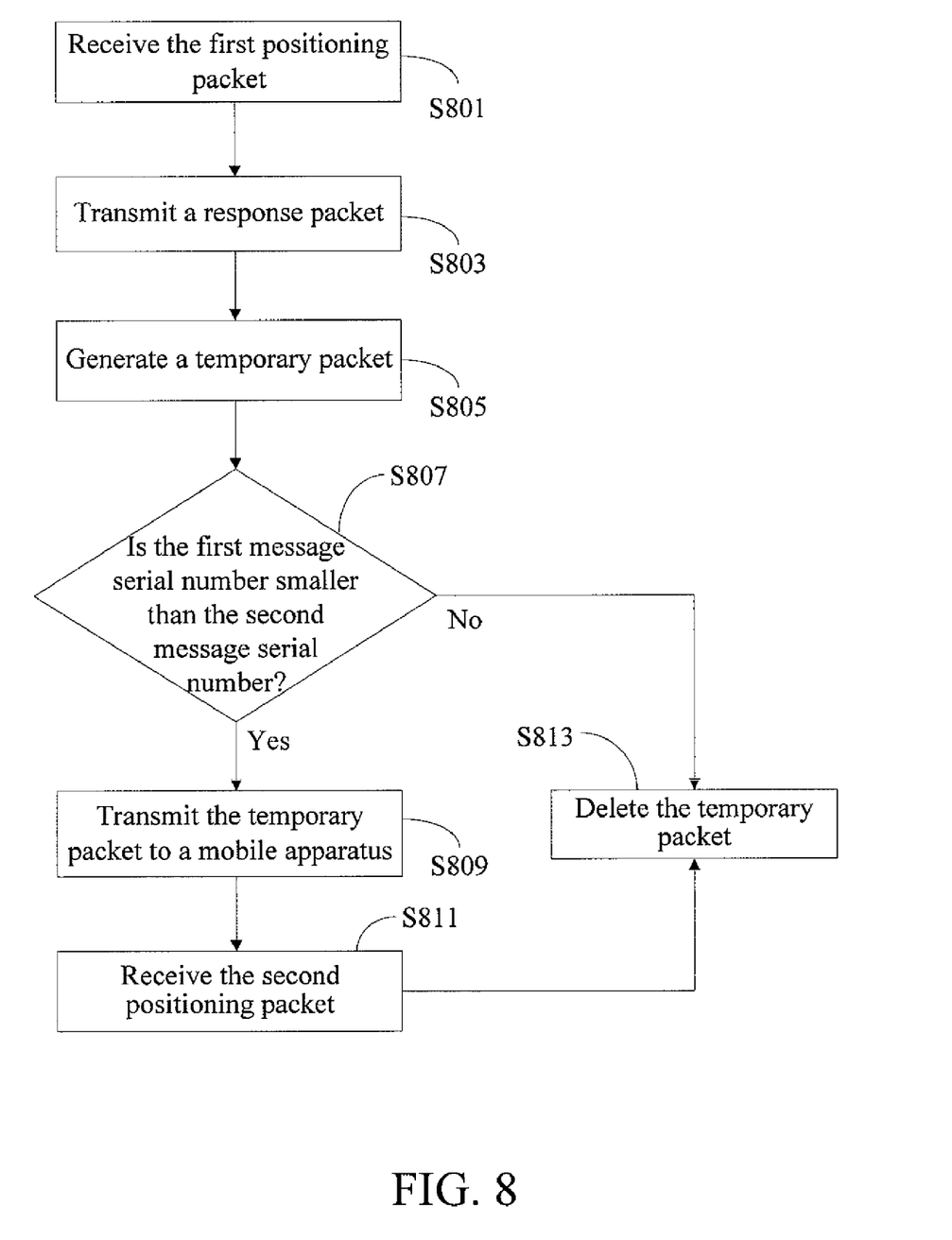
FIG. 8 is a flowchart of a sixth embodiment of this invention.

FIG. 8 depicts a sixth embodiment of this invention, which is a packet update method adapted for use in a host apparatus of a packet transmission system, such as the host apparatus 15 described in the fourth embodiment. More particularly, the packet update method of the sixth embodiment may be implemented by a computer program product. When the computer program product is loaded in the host apparatus via a computer and a plurality of instructions embodied therein is executed, the packet update method of the sixth embodiment can be accomplished. This computer program product may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

The packet update method of the sixth embodiment comprises the following steps. Initially, in step S801, a first positioning packet includes a first message serial number that is received. Subsequent to step S801 is step S803 where a response packet is transmitted. Subsequently in step S805, a first temporary packet includes a second message serial number that is generated. Next, in step S807, the first message serial number of the first positioning packet is compared to the second message serial number of the first temporary packet. If the first message serial number is not smaller than the second message serial number, step S813 is executed to delete the first temporary packet.

Otherwise, if the first message serial number is smaller than the second message serial number, step S809 is executed, where the first temporary packet is transmitted to the mobile apparatus. Subsequent to step S809 is step S811 where a second positioning packet includes the second message serial number that is received. Finally, in step S821, the first temporary packet is deleted.

In addition to the aforesaid steps, the sixth embodiment can also execute all the operations and functions of the host apparatus 15 of the fourth embodiment. The method in which the sixth embodiment executes these operations and functions will be readily appreciated by those of ordinary skill in the art based on the explanation of the fourth embodiment, and thus will not be further described herein.

In summary, the packet transmission system, the packet transmission method, the packet update method, the host apparatus and the computer program product thereof for the packet transmission system of this invention determine whether the content of an mobile apparatus has not been updated yet by comparing the positioning packet received via the host apparatus against the temporary packet stored therein to determine whether to transmit the temporary packet stored in the host apparatus to the mobile apparatus. Upon receiving the temporary packet, the mobile apparatus transmits another positioning packet to the host packet to confirm that the message contained in the temporary packet has been received by the mobile apparatus. This may not only prevent repeated transmission of the packets which would otherwise cause waste of network resources, but also accomplish the positioning purpose by using simple two-way transmission, thus further reducing power consumed in and enhancing the reliability of positioning the mobile apparatus.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A packet transmission method, comprising the steps of:
transmitting a first positioning packet, wherein the first positioning packet includes a first message serial number;
receiving the first positioning packet;
generating a first temporary packet, wherein the first temporary packet includes a second message serial number;
determining that the first message serial number of the first positioning packet is smaller than the second message serial number of the first temporary packet;
transmitting the first temporary packet;
receiving the first temporary packet and updating the first message serial number into the second message serial number; and
transmitting a second positioning packet wherein the second positioning packet includes the second message serial number.

2. The packet transmission method as claimed in claim 1, wherein the step of transmitting the first temporary packet further comprises the steps of:
choosing at least one base station from a plurality of base stations; and
transmitting the first temporary packet to the at least one chosen base station;
wherein the at least one chosen base station transmits the first temporary packet.

3. The packet transmission method as claimed in claim 2, further comprising the step of:
transmitting a response packet from one of the plurality of base stations after the first positioning packet is received.

4. The packet transmission method as claimed in claim 1, further comprising the step of:
transmitting a response packet after the first positioning packet is received.

5. The packet transmission method as claimed in claim 1, further comprising the step of:
deleting the first temporary packet after the second positioning packet is received.

6. The packet transmission method as claimed in claim 1, further comprising the steps of:
generating a second temporary packet, wherein the second temporary packet includes a third message serial number;
determining that the first message serial number of the first positioning packet is not smaller than the third message serial number of the second temporary packet; and
deleting the second temporary packet.

7. The packet transmission method as claimed in claim 6, wherein the third message serial number of the second temporary packet is larger than the second message serial number of the first temporary packet.

8. A packet transmission system, comprising:
  a mobile apparatus being configured to generate and transmit a first positioning packet, wherein the first positioning packet includes a first message serial number; and
  a host apparatus being configured to receive the first positioning packet and generate a first temporary packet, wherein the first temporary packet includes a second message serial number;
  wherein when the host apparatus determines that the first message serial number of the first positioning packet is smaller than the second message serial number of the first temporary packet, the host apparatus transmits the first temporary packet to the mobile apparatus;
  wherein after the mobile apparatus receives the first temporary packet, the mobile apparatus updates the first message serial number into the second message serial number, and then generates and transmits a second positioning packet including the second message serial number to the host apparatus.

9. The packet transmission system as claimed in claim 8, further comprising a plurality of base stations, wherein after the host apparatus chooses at least one base station from the plurality of base stations, the host apparatus transmits the first temporary packet to the at least one chosen base station, and the at least one chosen base station transmits the first temporary packet to the mobile apparatus.

10. The packet transmission system as claimed in claim 9, wherein one of the plurality of base stations transmits a response packet to the mobile apparatus after the first positioning packet is received.

11. The packet transmission system as claimed in claim 8, wherein the host apparatus transmits a response packet to the mobile apparatus after the first positioning packet is received.

12. The packet transmission system as claimed in claim 8, wherein the host apparatus deletes the first temporary packet after the second positioning packet is received.

13. The packet transmission system as claimed in claim 8, wherein the host apparatus generates a second temporary packet including a third message serial number, and the host apparatus is further configured to delete the second temporary packet when it determines that the first message serial number of the first positioning packet is not smaller than the third message serial number of the second temporary packet.

14. The packet transmission system as claimed in claim 13, wherein the third message serial number of the second temporary packet is larger than the second message serial number of the first temporary packet.

15. The packet transmission system as claimed in claim 13, wherein the first positioning packet further comprises a first mobile apparatus serial number, the first temporary packet further comprises a second mobile apparatus serial number, the second positioning packet further comprises a third mobile apparatus serial number, the second temporary packet further comprises a fourth mobile apparatus serial number, and the first mobile apparatus serial number, the second mobile apparatus serial number, the third mobile apparatus serial number and the fourth mobile apparatus serial number are equal to each other.

16. A computer program product stored in a non-transitory computer readable medium for a packet transmission system to perform a packet transmission method, the packet transmission system comprising a mobile apparatus and a host apparatus, the computer program product comprising:
  an instruction A for the mobile apparatus to transmit a first positioning packet, wherein the first positioning packet includes a first message serial number; and
  an instruction B for the host apparatus to receive the first positioning packet;
  an instruction C for the host apparatus to generate a first temporary packet, wherein the first temporary packet includes a second message serial number;
  an instruction D for the host apparatus to determine that the first message serial number of the first positioning packet is smaller than the second message serial number of the first temporary packet;
  an instruction E for the host apparatus to transmit the first temporary packet;
  an instruction F for the mobile apparatus to receive the first temporary packet and update the first message serial number into the second message serial number; and
  an instruction G for the mobile apparatus to transmit a second positioning packet, wherein the second positioning packet includes the second message serial number.

17. The computer program product as claimed in claim 16, wherein the packet transmission system further comprises a plurality of base stations, and the instruction E further comprises:
  an instruction E1 for the host apparatus to choose at least one base station from the plurality of base stations; and
  an instruction E2 for the host apparatus to transmit the first temporary packet to the at least one chosen base station;
  wherein the at least one chosen base station transmits the first temporary packet.

18. The computer program product as claimed in claim 17, wherein the computer program product further comprises:
  an instruction H for one of the plurality of base stations to transmit a response packet after the first positioning packet is received.

19. The computer program product as claimed in claim 16, wherein the computer program product further comprises:
  an instruction I for the host apparatus to transmit a response packet after the first positioning packet is received.

20. The computer program product as claimed in claim 16, wherein the computer program product further comprises:
  an instruction J for the host apparatus to delete the first temporary packet after the second positioning packet is received.

21. The computer program product as claimed in claim 16, wherein the computer program product further comprises:
  an instruction K for the host apparatus to generate a second temporary packet, wherein the second temporary packet includes a third message serial number;
  an instruction L for the host apparatus to determine that the first message serial number of the first positioning packet is not smaller than the third message serial number of the second temporary packet; and
  an instruction M for the host apparatus to delete the second temporary packet.

22. The computer program product as claimed in claim 21, wherein the third message serial number of the second temporary packet is larger than the second message serial number of the first temporary packet.

23. A packet update method, comprising the steps of:
  receiving a first positioning packet, wherein the first positioning packet includes a first message serial number;
  generating a first temporary packet, wherein the first temporary packet includes a second message serial number;
  determining that the first message serial number of the first positioning packet is smaller than the second message serial number of the first temporary packet; and
  transmitting the first temporary packet.

24. The packet update method as claimed in claim 23, wherein the step of transmitting the first temporary packet further comprises the steps of:
   choosing at least one base station from a plurality of base stations; and
   transmitting the first temporary packet to the at least one chosen base station.

25. The packet update method as claimed in claim 23, further comprising the step of:
   transmitting a response packet after the first positioning packet is received.

26. The packet update method as claimed in claim 23, further comprising the steps of:
   receiving a second positioning packet, wherein the second positioning packet includes the second message serial number; and
   deleting the first temporary packet after the second positioning packet is received.

27. The packet update method as claimed in claim 23, further comprising the steps of:
   generating a second temporary packet, wherein the second temporary packet includes a third message serial number;
   determining that the first message serial number of the first positioning packet is not smaller than the third message serial number of the second temporary packet; and
   deleting the second temporary packet.

28. The packet update method as claimed in claim 27, wherein the third message serial number of the second temporary packet is larger than the second message serial number of the first temporary packet.

29. A host apparatus, comprising:
   a receiving module, being configured to receive a first positioning packet, wherein the first positioning packet includes a first message serial number;
   a microprocessor, being configured to generate a first temporary packet, wherein the first temporary packet includes a second message serial number;
   a comparison module; and
   a transmitting module;
   wherein when the comparison module determines that the first message serial number of the first positioning packet is smaller than the second message serial number of the first temporary packet, the transmitting module transmits the first temporary packet.

30. The host apparatus as claimed in claim 29, wherein the microprocessor chooses at least one base station from a plurality of base stations, and the transmitting module transmits the first temporary packet to the at least one chosen base station.

31. The host apparatus as claimed in claim 29, wherein the transmitting module transmits a response packet after the receiving module has received the first positioning packet.

32. The host apparatus as claimed in claim 29, wherein the microprocessor deletes the first temporary packet after the receiving module has received a second positioning packet including the second message serial number.

33. The host apparatus as claimed in claim 29, wherein the microprocessor generates a second temporary packet including a third message serial number, and the microprocessor deletes the second temporary packet when the comparison module determines that the first message serial number of the first positioning packet is not smaller than the third message serial number of the second temporary packet.

34. The host apparatus as claimed in claim 33, wherein the third message serial number of the second temporary packet is larger than the second message serial number of the first temporary packet.

35. A computer program product stored in a non-transitory computer readable medium for a host apparatus to perform a packet update method, the host apparatus comprising a receiving module, a microprocessor, a comparison module and a transmitting module, the computer program product comprising:
   an instruction A for the receiving module to receive a first positioning packet, wherein the first positioning packet includes a first message serial number;
   an instruction B for the microprocessor to generate a first temporary packet, wherein the first temporary packet includes a second message serial number;
   an instruction C for the comparison module to determine that the first message serial number of the first positioning packet is smaller than the second message serial number of the first temporary packet; and
   an instruction D for the transmitting module to transmit the first temporary packet.

36. The computer program product as claimed in claim 35, wherein the instruction D further comprises:
   an instruction D1 for the microprocessor to choose at least one base station from a plurality of base stations; and
   an instruction D2 for the transmitting module to transmit the first temporary packet to the at least one chosen base station.

37. The computer program product as claimed in claim 35, wherein the computer program product further comprises:
   an instruction E for the transmitting module to transmit a response packet after the receiving module has received the first positioning packet.

38. The computer program product as claimed in claim 35, wherein the computer program product further comprises:
   an instruction F for the receiving module to receive a second positioning packet, wherein the second positioning packet includes the second message serial number; and
   an instruction G for the microprocessor to delete the first temporary packet after the second positioning packet is received.

39. The computer program product as claimed in claim 35, wherein the computer program product further comprises:
   an instruction H for the microprocessor to generate a second temporary packet, wherein the second temporary packet includes a third message serial number;
   an instruction I for the comparison module to determine that the first message serial number of the first positioning packet is not smaller than the third message serial number of the second temporary packet; and
   an instruction J for the microprocessor to delete the second temporary packet.

40. The computer program product as claimed in claim 39, wherein the third message serial number of the second temporary packet is larger than the second message serial number of the first temporary packet.

* * * * *